June 11, 1935.  J. C. E. SCHWAB  2,004,349
GLASS TRANSFER APPARATUS
Filed June 13, 1933   2 Sheets-Sheet 2
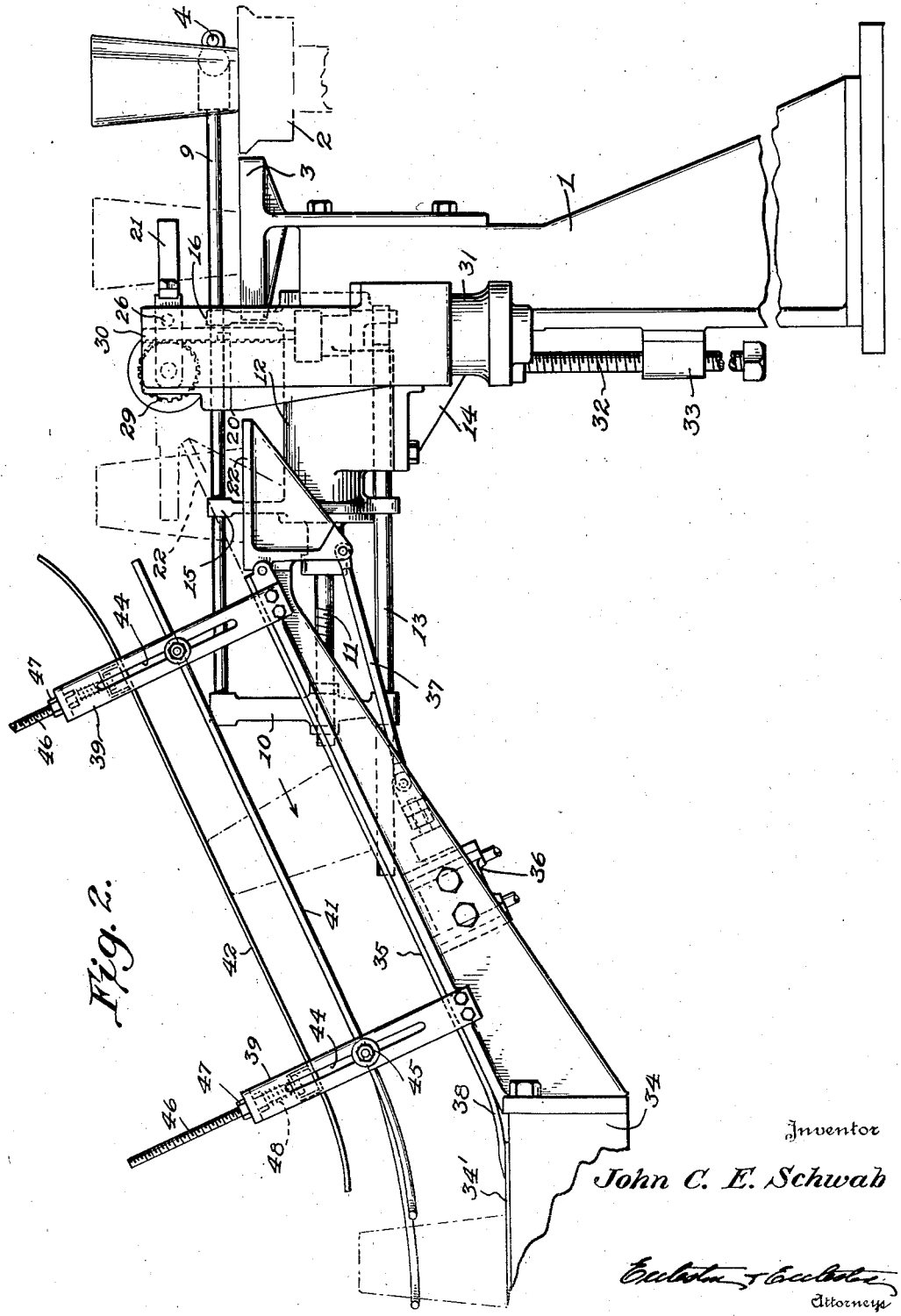
Inventor
John C. E. Schwab
Attorneys Patented June 11, 1935

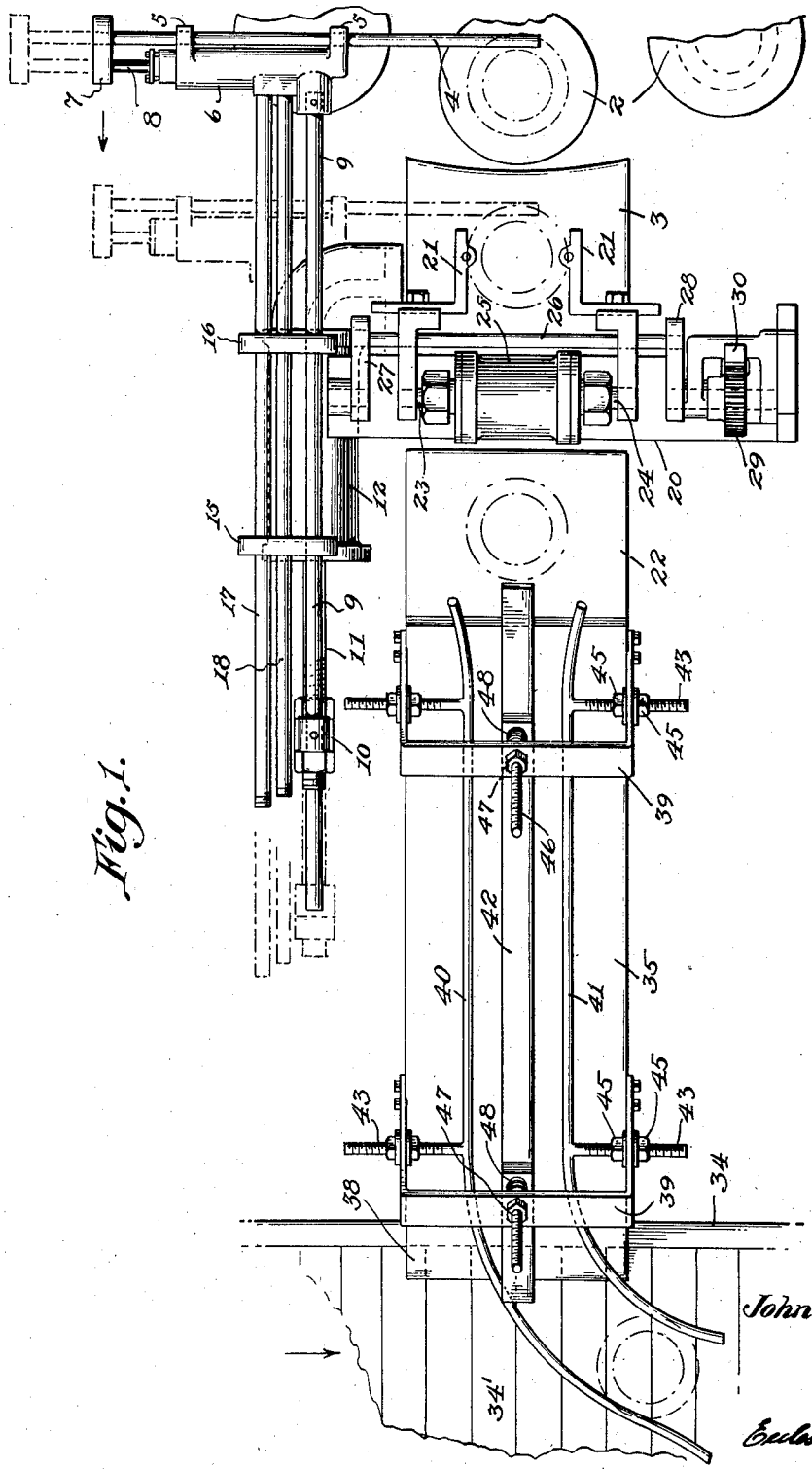

2,004,349

UNITED STATES PATENT OFFICE 2,004,349

GLASS TRANSFER APPARATUS

John C. E. Schwab, Clarksburg, W. Va., assignor to Hazel-Atlas Glass Company, Wheeling, W. Va., a corporation of West Virginia Application June 13, 1933, Serial No. 675,614

2 Claims. (Cl. 198—24)

This invention relates to the handling of glassware and has special reference to the transfer of ware from a glazer or fire polisher to a conveyer for transporting the ware to a leer or other desired point.

One of the objects of the invention is to provide a simplified and inexpensively operated mechanism for transferring glassware from the continuously moving conveyer of a glazer to a conveyer for transporting the ware to a leer or elsewhere.

Another object of the invention is to provide a mechanism of this character which will efficiently operate at an unusually high rate of speed.

A further object of the invention consists in the provision of a transfer mechanism having means by which the ware may be inverted during its transfer, if it is desirable to invert the particular ware being handled.

Other objects and advantages of the invention will be apparent to those skilled in the art from the following description when taken in connection with the accompanying drawings; in which, Figure 1 is a plan view of the apparatus, and Figure 2 is a side elevational view thereof.

Referring to the drawings in detail the numeral 1 indicates a standard or pedestal forming a support for mechanism for removing the ware from the continuously moving carriers 2 of the glazer to a table 3 which is mounted on the upper end of the pedestal.

The mechanism for removing the ware from the continuously moving carrier of the glazer comprises a bar 4 which is slidably mounted in guides 5 formed on the exterior of a cylinder 6. The opposite end of rod 4 is connected to a head 7 carried by piston rod 8 of the cylinder 6. Operations of the cylinder will of course extend or retract the bar 4, and the admission of compressed air to opposite ends of the cylinder is timed so that the rod will be extended when the cylinder is moved to its outermost position and will be retracted after the cylinder reaches its innermost position.

The cylinder 6 is secured to a rod 9 which is in turn secured to a crosshead 10. The crosshead 10 is adjustably mounted on a piston rod 11 associated with a horizontally disposed cylinder 12, and the lower end of the crosshead is slidably connected with a guide rod 13 secured to the under side of the cylinder 12. The cylinder 12 is supported on a bracket 14 which is preferably mounted for vertical adjustment, by any desired means (not shown) on the pedestal 1.

The rod 9 is slidably mounted intermediate its ends in brackets 15 and 16 secured to the cylinder 12, and these brackets also form supports for the pipes 17 and 18 which supply compressed air to opposite ends of the cylinder 6.

The mechanism thus far described provides simple yet effective means for transferring ware from the carriers 2 to the fixed table 3 and thence to the inverting mechanism, if such inverting mechanism is employed. I shall now briefly describe the mechanism for inverting the ware placed on the table and transferring it to another part of the apparatus. This mechanism, which is mounted on a plate 20, is substantially identical with that shown in the U. S. patent to Francis L. Crosbie #1,909,813 of May 16, 1933. The numeral 21 indicates the grippers for clamping the ware between them and for transferring it to a movable platform 22. The grippers are moved toward and from each other by piston rods 23 and 24 which are simultaneously operated in opposite directions by a pair of pistons within cylinder 25. A rod 26 extends through openings in the arms of the grippers 21, and the rod has its ends supported in crank-arms 27 and 28. These arms are oscillated by a pinion 29 and a rack 30, the latter being reciprocated by means of a cylinder 31.

As will be obvious, the mechanism just described first grips the piece of ware then swings it through 180° to a position on platform 22, then releases the ware and returns to its initial position to repeat the operation. It may be desirable to vary the vertical position of the grippers for ware of different heights and for this purpose a bolt 32 threaded through a boss 33 on pedestal 1, is provided. The upper end of this bolt (not shown) engages the support for plate 20 and thus may raise or lower the plate as desired.

It will be understood that the reciprocable bar 4 feeds the ware from the continuously moving carriers 2 of the glazer to the grippers 21 of the inverting mechanism, when the inverting mechanism is employed, and that the parts are so timed that the grippers will close just as the bar 4 supplies a piece of ware to them, and immediately after the closing of the grippers the device operates to invert and deposit the ware. The quick movement of the bar 4 to push the ware from the carrier to the grippers, instantly followed by the inverting of the ware, provides a very rapid operation.

The platform 22 on which the ware is placed in inverted position, forms part of a slide or chute for transferring the ware to a cross conveyer and may be entirely separate from the mechanism heretofore described. This part of the transfer apparatus is secured to one side of the frame 34 of a conveyer 34' which leads to a leer or to some other point. The slide, indicated by the numeral 35, inclines upwardly from the conveyer and at the upper end of the slide the platform 22 is pivoted so as to be swung into a horizontal plane as shown in full lines in Figure 2 or into the plane of the inclined slide as shown in dotted lines. The platform 22 is operated by means of an air cylinder 36 mounted on the under side of the slide and a link 37 which is pivoted to the piston rod of cylinder 36 and to a projection on the under side of the platform. It will thus be seen that the operations of the cylinder 36 will cause the platform to alternately assume the two positions shown in full and in dotted lines.

The slide proper includes an extension 38 which slightly overlaps the conveyer 34', and a pair of brackets 39. These brackets which are substantially U-shaped are inverted and are secured to the slide adjacent the upper and lower ends thereof.

Guide bars or rails 40 and 41 are mounted interiorly of the brackets 39 to guide and steady the ware during its travel down the slide, and a plate 42 suspended from the top of the brackets contacts with the tops of the pieces of ware to control the speed of the descent and also to prevent the ware from toppling over.

In the embodiment shown, the rails 40 and 41 are provided with threaded bolts 43 which extend through slots 44 in the legs of the brackets 39 and are locked in adjusted position by nuts 45. It will thus be seen that the rails may be adjusted vertically as well as toward and from the center line of the slide so as to adapt the device to various sizes of ware. The lower or inner ends of the rails 40—41 are curved in the direction of travel of the conveyer 43'.

The top plate 42 is also adjustable to accommodate various sizes of ware and to this end is provided with bolts 46 which extend through openings in the top of the inverted U-shaped members and which are locked in adjusted position by means of nuts 47. Springs 48 are preferably interposed between the plate 42 and brackets 39 to provide a slight pressure of the plate on the tops of the glass articles, thereby steadying the articles and controlling the speed with which they travel.

In the operation of the device the turnover mechanism including the grippers 21 will be employed only in those installations where it is desirable to invert the ware during its transfer. In the handling of other types of ware it will be projected directly from the fire polisher onto the tilting platform 22 by the pusher bar 4.

The operation of the apparatus, in conjunction with the inverting mechanism, will now be described.

As the ware is brought into line with the table 3 by the continuously moving carriers 2, the pusher bar 4 is moved to the position shown in full lines in Figure 1. Pressure air is now admitted to the right hand end of cylinder 12 thereby drawing the pusher bar to the dotted line position which moves the ware across the table 3 to a position between the grippers 21. Thereafter pressure air enters cylinder 6 to withdraw bar 4 longitudinally, and the action of cylinder 12 is reversed to project the cylinder 6 to the right. The bar 4 is then projected behind the next piece of ware to be transferred from the carriers 2, by admitting compressed air to the remote end of cylinder 6.

The article having been placed on the table 3 between the grippers 21, the grippers are then moved toward each other by cylinder 25 to grip the ware. Cylinder 31 is now energized to raise the rack 30 and through pinion 29 swing the ware through an angle of 180° to the dotted line position shown in Figure 2. Air is then admitted to the center of cylinder 25 to move the grippers apart to release the ware and is also admitted to the upper end of cylinder 31 to swing the grippers back to starting position. As soon as the ware is positioned on the platform 22 and released the cylinder 36 is operated to tilt the platform to dotted line position in the plane of slide 35. The piece of ware thereupon slides down the chute by gravity and is delivered to the conveyer 34' for transporting it to a leer or to some other desired point.

The desired sequence of operation of the cylinders 6, 12, 25, 31 and 36, is controlled by an ordinary timing mechanism. As such timing mechanisms are old and well known in the art, illustration thereof is unnecessary.

In installations where it is undesirable to invert the ware, the inverting mechanism is omitted and the ware is fed by the bar 4 directly from the carriers 2 to the tiltable platform 22.

From the foregoing description and attached drawings it will be apparent to those skilled in the art that I have devised an extremely simple and inexpensively operated mechanism for transferring ware from a continuously moving glazer to a conveyer for transporting it to the desired point; and that while it is adapted to invert the ware while being transferred, the inverting mechanism may be readily omitted and the ware conveyed to its destination in the original upright position in which it was received.

In accordance with the patent statutes I have described herein the preferred form of construction of the apparatus but obviously various changes and modifications may be made without departing from the spirit of the invention, and all such changes and modifications are intended to be included within the scope of the appended claims.

What I claim is:

1. Transfer mechanism for glassware, including a continuously moving carrier, a table adjacent the carrier, inverting means associated with the table, a tiltable platform, a chute leading from the tiltable platform, means for sweeping ware in substantially a horizontal plane from the continuously moving carrier and across the table to the inverting means, means for operating the inverting means to invert the ware and deposit it upon said tiltable platform, and means for tilting the platform to deliver the ware to said chute.

2. Transfer mechanism for glassware, including a continuously moving carrier, inverting means adjacent said carrier, said inverting means including a pair of grippers, a tiltable platform, a chute leading from the tiltable platform, means for sweeping ware in substantially a horizontal plane from the continuously moving carrier to said grippers, means for operating the inverting means to invert the ware and deposit it upon said tiltable platform, and means for tilting the platform to deliver the ware to said chute.

JOHN C. E. SCHWAB.